May 23, 1933. F. E. SELLMAN 1,910,504
REFRIGERATOR CABINET
Filed Oct. 8, 1929
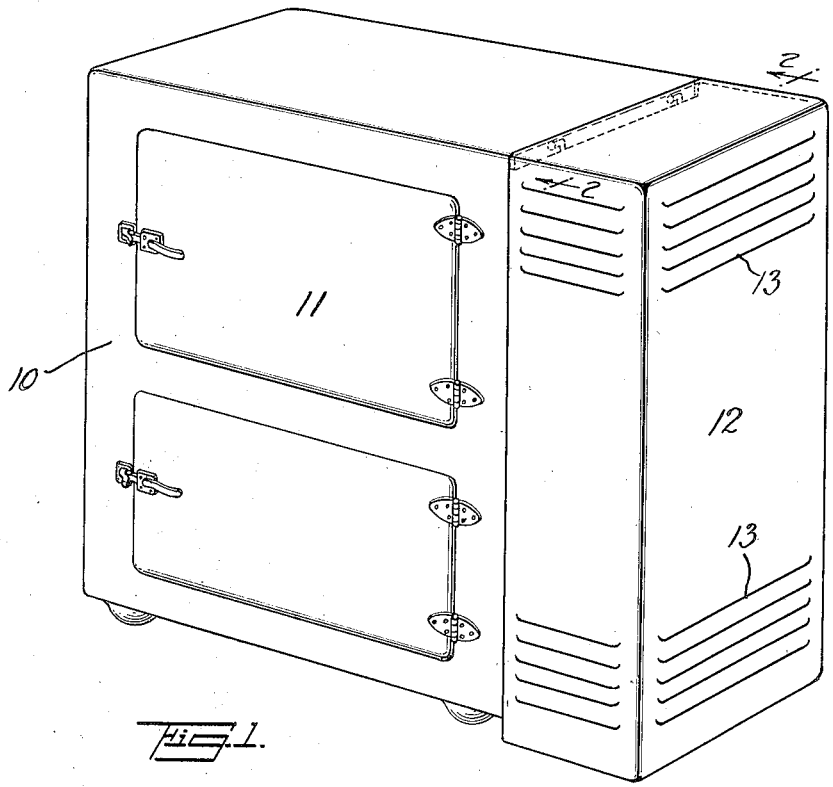
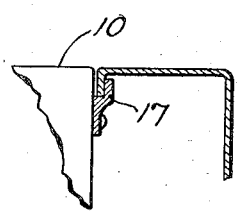
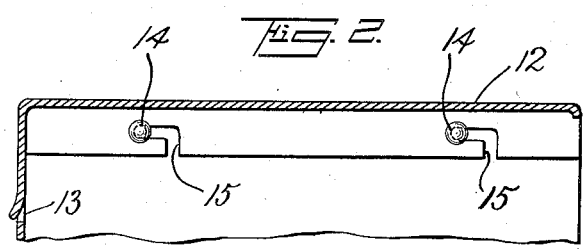
INVENTOR
BY
his ATTORNEY Patented May 23, 1933

1,910,504

UNITED STATES PATENT OFFICE

FOLKE EMIL SELLMAN, OF WHITE PLAINS, NEW YORK, ASSIGNOR, BY MESNE ASSIGNMENTS, TO ELECTROLUX SERVEL CORPORATION, OF NEW YORK, N. Y., A CORPORATION OF DELAWARE

REFRIGERATOR CABINET

Application filed October 8, 1929. Serial No. 398,147.

My invention relates to refrigerators of the type employing automatic apparatus for obtaining refrigeration.

The invention consists in providing a refrigerator comprising an insulated cabinet with a removable cover attached thereto, such cover serving to enclose refrigerating apparatus and being so arranged that it can be readily removed although the refrigerator is placed in a small space. The present invention is particularly adaptable for use in apartments where refrigerators are placed in small spaces with the walls close to the refrigerator on either side.

The invention is illustrated by means of the accompanying drawing whereon

Fig. 1 shows a refrigerator cabinet including the invention;

Fig. 2 is a sectional view taken on the line 2—2 of Fig. 1; and

Fig. 3 shows another embodiment of the invention.

The refrigerator comprises an insulated cabinet 10 having doors 11 and insulated to maintain the interior thereof cold. This insulated cabinet serves for the reception of food. To one side of cabinet 10 is an auxiliary cover 12 having openings 13 for passage of air. Under this cover is arranged the refrigerating apparatus. This may be of the general type disclosed in von Platen et al Patent No. 1,651,007 granted November 29, 1927. A part of this apparatus projects inside the cabinet 10 and a part is outside the same under cover 12.

This cover may be secured to cabinet 10 in a number of ways so long as the cover can be removed without moving the cover sideways. To accomplish this purpose I may provide headed pins 14, (Fig. 2), fixed into the cabinet and co-operating slots 15 in the cover, the arrangement being such that the slots pass between the heads of pins 14 and cabinet 10. The cover is removed by pulling the same slightly forward and then slightly upward whence it can be withdrawn straightforward as the back of the same is open.

Another manner of carrying out the invention is shown in Fig. 3 wherein a bar 17 is attached horizontally to the insulated cabinet. The bar forms a channel into which the down-turned edge of the cover fits. This cover may be removed by simply pulling it forward.

When the cover is assembled with the cabinet the whole gives a neat appearance while providing ready accessibility for repair or inspection of the refrigerating apparatus and at the same time requiring a very small space.

I claim:

1. A refrigerator comprising an insulated cabinet for reception of food, an auxiliary cover having contact with the outer wall of the cabinet and forming a compartment having an open back, means forming a horizontal channel adjacent the cabinet and said cover having a down-turned edge fitting into the channel, the arrangement being such that the cover can be removed by simply pulling the same forward.

2. A refrigerator comprising an insulated cabinet for reception of food, and an auxiliary uninsulated cover adapted to house refrigerating mechanism, said cover forming an extension of said cabinet and having substantially the same vertical dimension as the cabinet and also having an open end when the cover is in position, means forming a guideway connected to a wall of the cabinet, and means on said cover for cooperation with said guideway and slidable therein so that the cover can be removed by pulling the same forward.

In testimony whereof I have affixed my signature.

FOLKE EMIL SELLMAN.